United States Patent [19]
Nakayama et al.

[11] Patent Number: 5,085,542
[45] Date of Patent: Feb. 4, 1992

[54] INDEXABLE CUTTING INSERT

[75] Inventors: Masaaki Nakayama; Masayuki Okawa, both of Tokyo, Japan

[73] Assignee: Mitsubishi Materials Corporation, Tokyo, Japan

[21] Appl. No.: 570,854

[22] Filed: Aug. 22, 1990

[30] Foreign Application Priority Data

Aug. 23, 1989 [JP] Japan ................. 1-98339[U]

[51] Int. Cl.⁵ ............................................. B26D 1/00
[52] U.S. Cl. ............................................... 407/114
[58] Field of Search ................ 407/100, 114, 115, 116

[56] References Cited

U.S. PATENT DOCUMENTS

| | | | |
|---|---|---|---|
| 3,344,496 | 10/1967 | Patkay | 407/114 |
| 4,068,976 | 1/1978 | Friedline | 407/114 |
| 4,116,576 | 9/1978 | Gawryk, Sr. | 407/114 |
| 4,248,553 | 2/1981 | Kraemer | 407/114 |
| 4,645,386 | 2/1987 | Smith | 407/114 X |

FOREIGN PATENT DOCUMENTS 2823588 12/1978 Fed. Rep. of Germany .
3800126 7/1988 Fed. Rep. of Germany .
2317986 2/1977 France .

OTHER PUBLICATIONS

European Search Report-Appln. No. EP 90 11 6162, Feb. 20, 1991.

Primary Examiner—Larry I. Schwartz
Assistant Examiner—J. Daulton
Attorney, Agent, or Firm—Cushman, Darby & Cushman

[57] ABSTRACT

There is disclosed an indexable cutting insert including at least one cutting surface, at least one flank intersecting with the cutting surface, cutting blade defined along the cross line between the cutting surface and the flank, at least one primary nick formed on the flank so as to extend in a direction perpendicular to the cutting blade, and at least one secondary nick formed on the cutting surface in succession to the primary nick so as to extend in a direction perpendicular to the cutting blade.

8 Claims, 5 Drawing Sheets

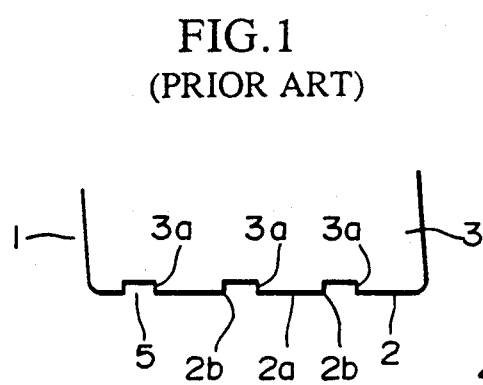
FIG.1 (PRIOR ART)
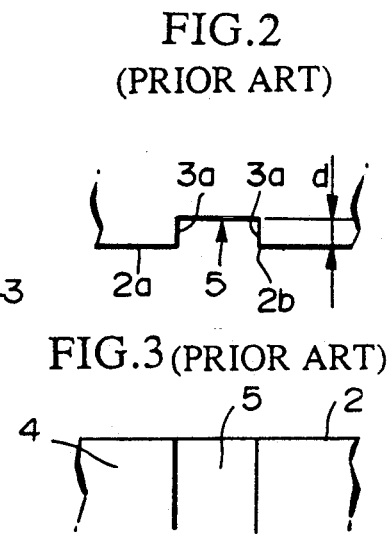
FIG.2 (PRIOR ART)
FIG.3 (PRIOR ART)
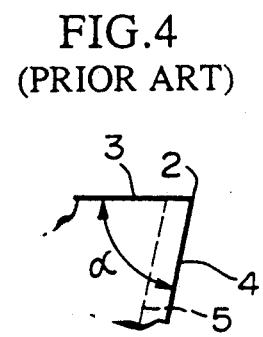
FIG.4 (PRIOR ART)
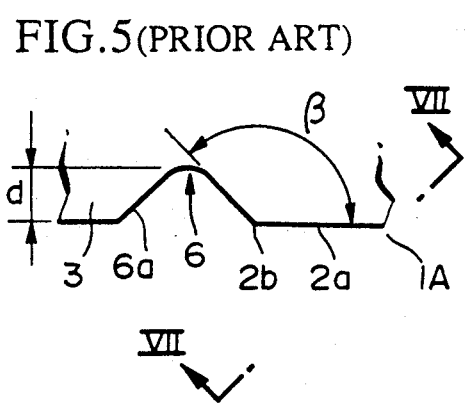
FIG.5 (PRIOR ART)
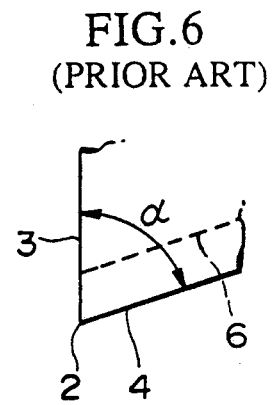
FIG.6 (PRIOR ART)
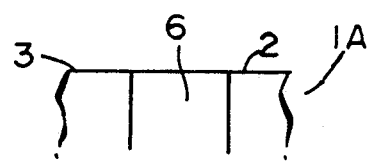
FIG.7 (PRIOR ART)

INDEXABLE CUTTING INSERT

BACKGROUND OF THE INVENTION

1. Field of the Invention

The present invention relates to an indexable cutting insert releasably secured to, for example, cutting tools chiefly for use in surface cutting operation such as facing, peeling or the like, more particularly, to an indexable cutting insert capable of suppressing chattering generated during cutting.

2. Prior Art

FIGS. 1 to 3 depict a conventional indexable cutting insert 1 for cutting tools for use, for example, in facing an inner or outer surface of a cylindrically shaped workpiece. This cutting insert 1 is secured on a tool holder which is movable and rotatable relative to the workpiece.

The indexable cutting insert 1 is formed, by powder metallurgy process, in a parallelogramic plate. A cutting blade 2 is defined along the crossing line of a cutting surface 3 and a flank 4. On the flank 4, several nicks 5 are formed in parallel to each other, so as to extend in a direction perpendicular to the cutting blade 2, and each nick has a trapezoidal cross-section. Thus, cutting blade 2 is divided into blade segments 2a.

In the above-mentioned cutting insert 1, chips generated in cutting process are subdivided into pieces by blade segments 2a, and transferred through nicks 5, therefore, reacting force through cutting is decreased and chattering of the cutting insert 1 or cutting tool is suppressed. But, as a result of cutting blade's separation, edge portion 2b of blade segment 2a is inclined to crack or fracture, especially when the insert 1 is positive, i.e., the cross axes angle α between cutting surface 3 and flank 4 is acute, as is shown in FIG. 4, this tendency is more obvious.

In order to prevent such fracture of blade segment 2a during cutting 1A, a cutting insert as shown in FIGS. 5 to 7 is developed, wherein nicks 6 are formed of V type cross-section. In this type of cutting insert, the inner side surface 6a of nick has larger obtuse angle β against flank 4, thus the edge portion 2b of each blade segment 2a has more durability against fracture than the previously mentioned conventional cutting insert. Although, as the rake angle α of the cutting insert is the same as shown in FIG. 4, appropriate improvement against fracture is impossible.

Another problem to be solved about the conventional cutting insert 1, 1A is that feed pitch of the workpiece to the cutting insert is limited within the depth of nick d. If feed pitch overcomes the depth of nick d, chip-subdividing function is suppressed, and cutting insert should lose above-mentioned anti-chattering effect. But, if the depth of nick should be set larger, not only each blade segment 2a but also the whole cutting insert loses stiffness.

SUMMARY OF THE INVENTION

It is, accordingly, an object of the present invention to provide an indexable cutting insert for cutting tools chiefly for use in surface cutting operation, which enables a reduction in the resistance force acting between workpiece and cutting insert, and to suppress chattering of the insert, workpiece or cutting tool.

It is another important object of the invention to provide a cutting insert capable of obtaining good durability.

According to the present invention, there is provided a cutting insert releasably secured to cutting tools, including at least one cutting surface, at least one flank intersecting with the cutting surface, cutting blade defined along the cross line between the cutting surface and the flank, at least one primary nick formed on the flank so as to extend in a direction perpendicular to the cutting blade, and at least one secondary nick formed on the cutting surface in succession to the primary nick so as to extend in a direction perpendicular to the cutting blade.

BRIEF DESCRIPTION OF THE DRAWING

FIG. 1 is a partial plan view of the conventional indexable cutting insert;

FIG. 2 is an enlarged plan view of the conventional indexable cutting insert shown in FIG. 1;

FIG. 3 is a front view of the indexable cutting insert shown in FIG. 1;

FIG. 4 is a side view of another conventional indexable cutting insert;

FIG. 5 is a plan view of another indexable conventional cutting insert;

FIG. 6 is a side view of cutting insert shown in FIG. 5;

FIG. 7 is an elevational view taken along lines V—V of FIG. 5;

DESCRIPTION OF THE PREFERRED EMBODIMENTS OF THE INVENTION

Referring first to FIGS. 8 to 13, there is shown an indexable cutting insert 11 according to the first embodiment of the invention.

Figure 8:
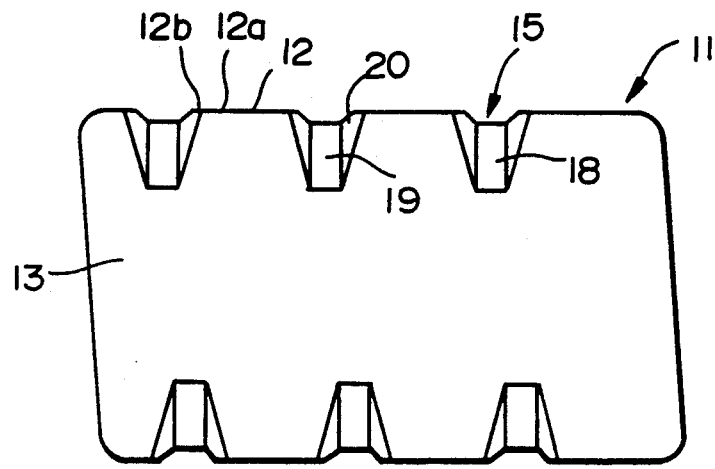
FIG. 8 is a plan view of the indexable cutting insert of first embodiment according to the present invention.
Figure 9:
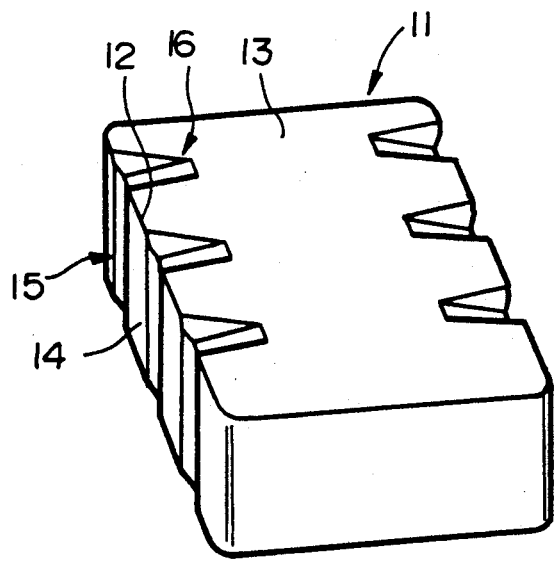
FIG. 9 is a perspective view of the cutting insert shown in FIG. 8.
Figure 10:
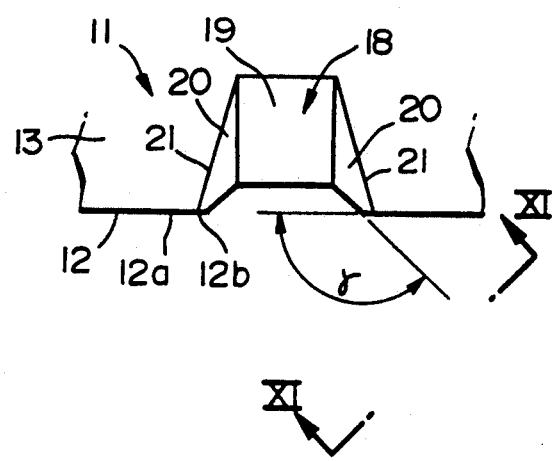
FIG. 10 is a partial enlarged plan view of the indexable cutting insert shown in FIG. 8.
Figure 11:
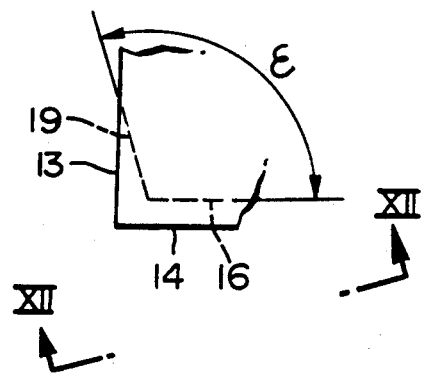
FIG. 11 is a partial side view of the indexable cutting insert shown in FIG. 8.
Figure 13:
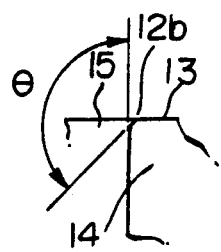
FIG. 13 is a partial enlarged view taken along lines XIII—XIII of FIG. 10.
Figure 12:
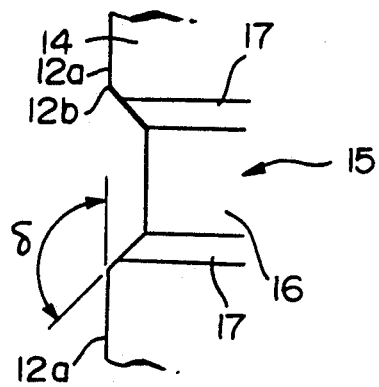
FIG. 12 is a view of the indexable cutting insert taken along lines XII—XII of FIG. 11.
Figure 16:
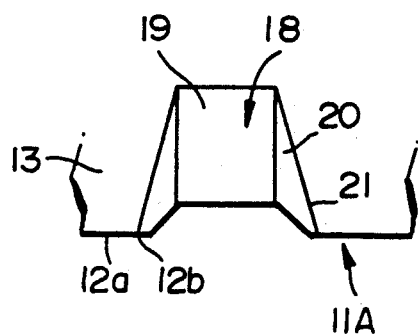
FIG. 16 is an enlarged partial plan view of the cutting insert shown in FIG. 15.

The indexable cutting insert 11 is made of hard material like cemented carbide or the like, manufactured through powder metallurgy process, and is formed in a parallelogramic plate. Cutting blades 12 are defined along the crossing line of cutting surfaces 13 and flanks 14. The top and bottom surfaces are defined as cutting surface 13, and the side surfaces along the longitudinal direction of the insert 11 are defined as flanks 14. The insert 11 shown in FIG. 8 is a negative type insert, i.e., wherein the cross angle between cutting surface 13 and flank 14 is arranged 90 degrees.

On each flank 14, one or a plurality of primary nick 15 (three nicks per a flank are shown in the figures) is formed in parallel to each other so as to extend in a direction perpendicular to the cutting blade 12, and each primary nick 15 is defined by a bottom surface 16 and two sidewalls 16 in a trapezoidal cross-section. The bottom surface 17, parallel to the flank 14, intersects with each sidewall 17 forming an obtuse angle $\gamma$.

By the primary nick 15, the cutting blade 12 is divided into at least two blade segments 12a, in each of which at least one edge portion 12b is assembled.

In succession to each primary nick 15, there is formed a secondary nick 18 on the cutting surface 13 so as to extend in a direction perpendicular to the cutting blade 12. The secondary nick 18 is defined by a bottom surface 19 and two sidewalls 20 with trapezoidal intersection, and the bottom surface 19 and each sidewall 20 intersect with each other at an obtuse angle $\delta$. The bottom surface 19 of the secondary nick 18 has an obtuse cross angle $\epsilon$ between the bottom surface 16 of the primary nick 15 successive thereto, i.e., bottom surfaces 16, 19 are in a crossing relation to each other with an angle $\epsilon$. Although, each bottom surfaces 16, 19 are arranged to have almost the same width, the distance between crossing points of sidewall surfaces 17 of the primary nick 15 to the cutting blade 12 is arranged narrower than the distance between crossing points of sidewall surfaces 20 of the secondary nick to the cutting blade 12, and thus, each edge portion 12b of the blade segment 12a is processed into dull shape, as shown as an angle $\theta$ in FIG. 13. Subsidiary blades 21 are defined along the cross lines of the cutting surface 13 and the sidewall surfaces 20 of the secondary nick 18, whose length depends on the angle $\epsilon$ shown in FIG. 11 and is consequently larger than the subsidiary blade 3a which is formed on the cutting edge in previously mentioned insert 1, as shown in FIG. 2.

In the above-described cutting insert 11, as each edge portion 12b of the blade segment 12a is dull, when viewed from every direction, fracturing in this portion is prevented during cutting operations, thus durability is acquired, and operation without interference is obtained.

In the cutting process, workpiece is cut simultaneously by the cutting blades 12 and the subsidiary blades 21. Chips generated through cutting process are divided into pieces and is forced to flow into several ways restricted by the primary nicks 15 and the secondary nicks 18. Therefore, even when cutting a workpiece with a feed pitch larger than the depth of primary nick 15, chips are subdivided and excluded without difficulty, and thus chattering is suppressed and a smooth cutting operation is obtained.

Figure 17:
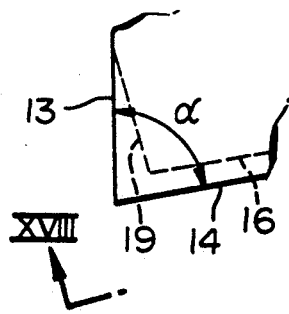
FIG. 17 is a partial side view of the indexable cutting insert shown in FIG. 15.
Figure 18:
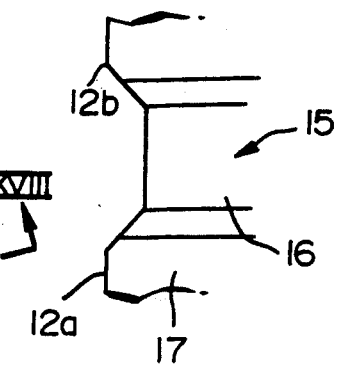
FIG. 18 is a view of the indexable cutting insert taken along lines XVIII—XVIII of FIG. 17.
Figure 14:
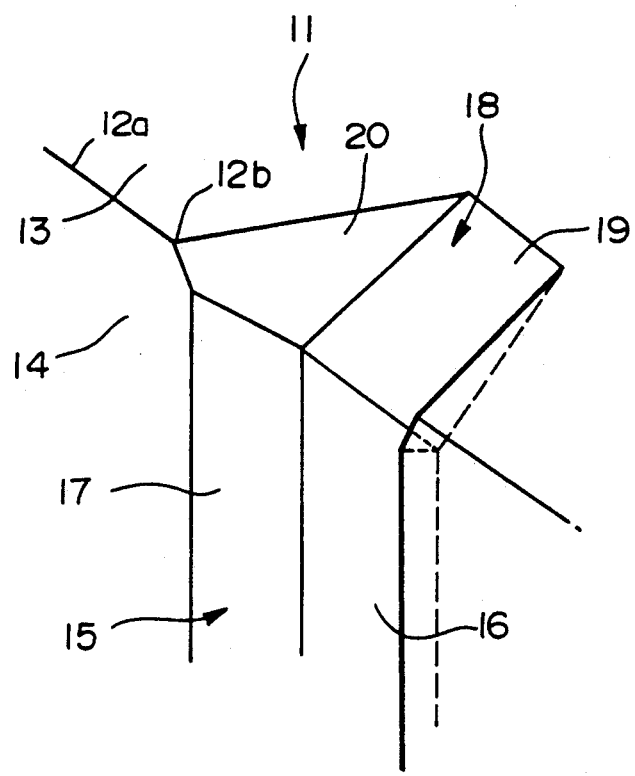
FIG. 14 is an enlarged perspective view of the cutting insert shown in FIG. 8.
Figure 15:
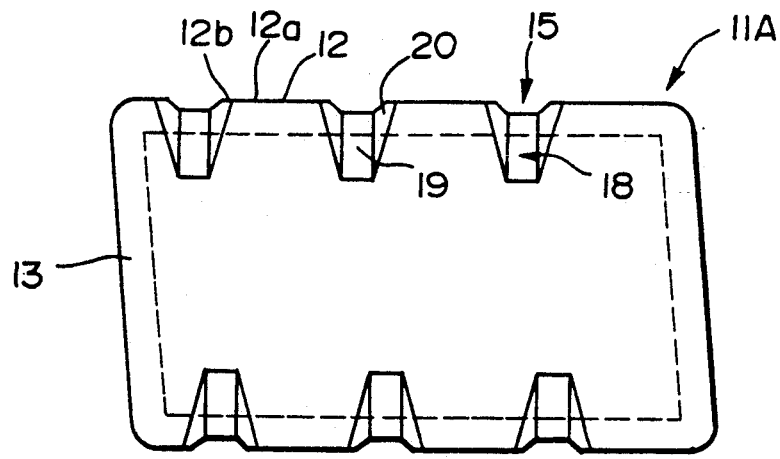
FIG. 15 is a plan view of the cutting insert of the second embodiment according to the present invention.
Figure 19:
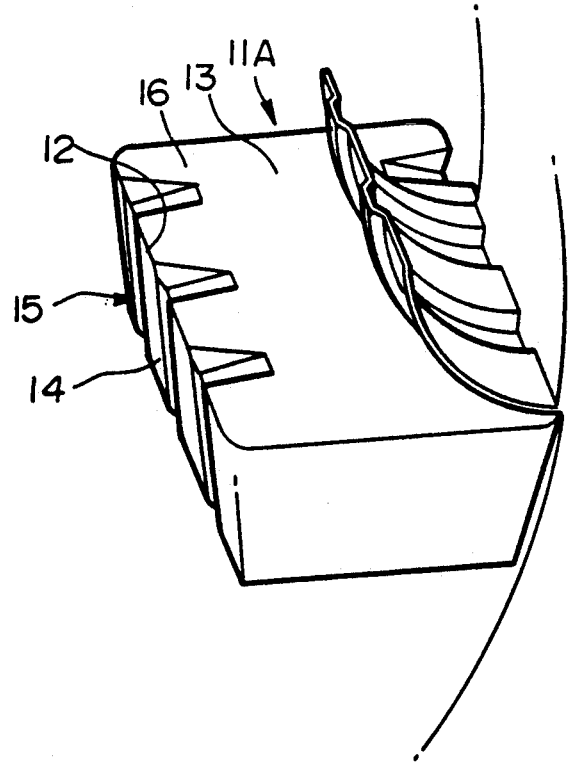
FIG. 19 is a perspective view of the indexable cutting insert shown in FIG. 15.

FIGS. 15 to 19 depict an indexable cutting insert 11A of a second embodiment according to the present invention. As is shown in FIG. 17, this cutting insert 11A is of positive type, i.e., the cross angle $\alpha$ of cutting surface 25 and flank 21 is acute. As is mentioned previously, insert of this type is inclined to fracture at the edge portion 12b of each blade segment 12a. Although, in the cutting insert 11A according to the present invention, as each edge portion 12b of the blade segment 12a is dull, when viewed from every direction, fracturing in this portion is prevented in cutting operation, and thus durability is acquired, and operation without interference is obtained.

In both embodiments described above, as cutting inserts are processed through powder metallurgy process and is formed in a press dies, manufacturing is easy and not expensive.

According to the present invention, various variation to the above-described embodiments is possible, for example, the shape of the insert is not limited to a rectangle, the cross section of nick is not limited to a trapezoid.

What is claimed is:

1. An indexable cutting insert comprising:
   (a) at least one cutting surface;
   (b) at least one flank intersecting with said cutting surface;
   (c) a cutting blade defined along the cross line between said cutting surface and said flank;
   (d) at least one primary nick formed on said flank, so as to extend in a direction perpendicular to said cutting blade;
   (e) at least one secondary nick formed on said cutting surface in succession to said primary nick so as to extend in a direction perpendicular to said cutting blade and such that the depth of said secondary nick becomes progressively less as said secondary nick extends perpendicularly away from said cutting blade; and
   (f) said primary nick being defined by a bottom surface and two sidewalls, said secondary nick being defined by a bottom surface and two sidewalls, and the distance between crossing points of said sidewall surfaces of said primary nick to said cutting blade is less than the distance between crossing points of said sidewall surfaces of said secondary nick to said cutting blade.

2. An indexable cutting insert according to claim 1, in which said primary nick and said secondary nick are formed in trapezoidal cross-section.

3. An indexable cutting insert according to claim 1 formed in a rectangular shape.

4. An indexable cutting insert according to claim 1, in which cross axes angle between said cutting surface and said flank is a right angle.

5. An indexable cutting insert according to claim 1, in which cross axes angle between said cutting surface and said flank is an acute angle.

6. An indexable cutting insert according to claim 1, in which a plurality of said primary nicks and a plurality of said secondary nicks are formed.

7. An indexable cutting insert according to claim 1 formed in a polygonal plate.

8. An indexable cutting insert according to claim 7 formed in a parallelogramic plate.

* * * * *